United States Patent [19]
Lichtenstein

[11] 3,887,704
[45] June 3, 1975

[54] AQUEOUS ZINC SOLUTIONS FOR PHYSIOLOGICAL USE

[76] Inventor: Joseph Lichtenstein, 101 Devon Rd., Colonia, N.J. 07067

[22] Filed: Mar. 12, 1974

[21] Appl. No.: 450,390

[52] U.S. Cl. ............................... 424/145; 424/289
[51] Int. Cl.² ......................................... A61K 27/00
[58] Field of Search ........................... 424/145, 289

[56] References Cited
UNITED STATES PATENTS
3,087,861  4/1963  Yardney et al. ................... 424/145
3,509,254  4/1970  Krotinger et al. .................. 424/289

Primary Examiner—Sam Rosen

[57] ABSTRACT

Aqueous zinc solutions for use in physiological administration containing a water-soluble zinc salt in a proportion sufficient to provide a physiologically active zinc ion concentration and at least one other physiologically active ingredient in a proportion normally tending to insolubilize the zinc ions. Insolubilization of the zinc is inhibited by incorporating in the solution a neutralized salt which is water-soluble at a pH within the range of from 5.0 to 8.5 and which has an acid moiety whose zinc salt is water-soluble at a pH in the range of from 5.0 to 8.5. The weight ratio of the neutralized salt to the zinc salt in the solution is within the range of from about 0.1 to about 40.

11 Claims, No Drawings

3,887,704

AQUEOUS ZINC SOLUTIONS FOR PHYSIOLOGICAL USE

This invention relates to aqueous zinc solutions for use in physiological administration, and more particularly, to a method of inhibiting the insolubilization of zinc ions in such solutions additionally containing other physiologically active ingredients which normally tend to insolubilize zinc ions.

The use of zinc in aqueous solution is well known for its medicinal, nutritive and deodorant properties in various physiological applications. For example, aqueous zinc solutions are used to provide deodorant effects in irrigations, enemas, and related preparations, to aid healing of dermatological and mucous membrane inflammations, and to provide zinc in soluble form for nutrient supplemental purposes. In such applications, it is often desirable to include in the solution one or more other physiologically active ingredients, such as phosphate ions, soaps, fatty acids, proteins, protein hydrolysates and the like. When relatively high levels of these other ingredients are incorporated in the solution, however, zinc phosphate, zinc hydroxide or other insoluble zinc compounds tend to precipitate out and these insoluble compounds predominate leaving insufficient small amounts of zinc in solution.

Several techniques are known which, under the conditions described above, would normally be effective in suppressing formation of zinc phosphate, zinc hydroxide or other insoluble zinc compounds. These techniques, however, are not entirely suitable when the composition is to be used in physiological administration. For example, one technique would be to reduce the pH of the solution below 5.0, preferably to about 4.0 or lower, with any suitable acid. However, under physiological conditions with, for example, a hypertonic level of phosphates present, a reduction in pH of below 5.0 can induce tissue irritation. Reduction in pH below neutrality will also cause fatty acids to precipitate from soap or detergent solutions containing zinc. Another technique would be to use a chelating agent for zinc, such as ethylenediaminetetracetic acid (EDTA). In simple zinc solutions such technique will work using a physiologically acceptable ratio of EDTA to zinc on the order of about 6 to 1. However, in the presence of high levels of phosphate or other insolubilizing species at or near physiological pH (7.4), a higher EDTA to zinc ratio, on the order of about 8 to 1 or higher, is required. This necessitates the use of more complexing agent than would be desired for certain pharmaceutical solutions, especially those solutions intended for systemic administration. Another method previously proposed would be to use certain acids such as citric acid, tartaric acid, and the like, in their free acid form. Unfortunately, their use requires a reduction in pH below 5.0 which, as noted above, may produce undesirable tissue irritation.

Accordingly, it is an object of the invention to provide aqueous zinc solutions for use in physiological administration containing a physiologically active zinc ion concentration at or near physiological pH and wherein the zinc remains in solution in the presence of relatively high levels of phosphates, soaps, fatty acids or other physiologically active ingredients normally tending to insolubilize the zinc.

Another object of the invention is to provide a method of inhibiting insolubilization of zinc under the conditions described above, without the need to reduce the pH of the solution below the level desirable for physiological administration.

A further object of the invention is to provide a method of inhibiting the insolubilization of zinc under the conditions described above, without the need to incorporate in the solution physiologically irritating or otherwise physiologically undesirable levels of additives.

The above and other objects are achieved in accordance with the present invention by incorporating in an aqueous solution containing a water-soluble zinc salt in a proportion sufficient to provide a physiologically active zinc ion concentration and at least one other physiologically active ingredient in a proportion normally tending to insolubilize the zinc, a neutralized salt which is water-soluble at a pH within the range of from 5.0 to 8.5 and which has an acid moiety whose zinc salt is water-soluble at a pH within the range of from 5.0 to 8.5. It has been found that such neutralized salt effectively inhibits the insolubilization of the zinc ions by the other physiologically active ingredient without adversely affecting the resulting solution for use in physiological administration. The pH of the resulting solution can be maintained within the range acceptable for physiological adminstration, i.e. within the range of from 5.0 to 8.5, and preferably within the range of from 6.0 to 7.5. The resulting solutions can hence be used to provide deodorant effects in irrigations, enemas, and related preparations, to aid healing of dermatological and mucous membrane inflammations, or to provide zinc in soluble form for nutrient supplemental purposes, without the undue tissue irritation and other undesirable side effects described above in connection with the previously known techniques for inhibiting insolubilization of zinc.

Any water-soluble zinc salt, such as zinc chloride, zinc nitrate, zinc sulfate, zinc acetate and the like, may be used in preparing the aqueous zinc solutions of the present invention. The water-soluble zinc salt is employed in a proportion sufficient to provide a physiologically active zinc ion concentration, depending upon the particular physiological application for which the solution is to be used. For example, for providing a deodorant effect in enemas or for use as a skin dressing or topical cleanser, a zinc ion concentration on the order of about 0.10% is generally effective.

The other physiologically active ingredient present in the aqueous zinc solutions of the present invention and its proportion therein will obviously also be dependent upon the particular physiological application for which the solution is to be used. In general, this ingredient would generally be a water-soluble phosphate, soap, fatty acid, protein, protein hydrolysate or the like. For instance, aqueous zinc solutions to be used as an enema would generally contain high laxation-producing levels of phosphate ion in the form of, for example, sodium phosphate. Solutions to be used as soap enemas or topical cleansers would contain relatively high levels of soap such as, for example, castile soap which is high in sodium oleate and sodium palmitate. In all of these applications, the physiologically effective amount of the other active ingredient would generally be such as to normally tend to insolubilize the zinc ion in the solution.

The neutralized salt employed for inhibiting the insolubilization of zinc ions in the aqueous zinc solutions of the present invention may be any salt, or a mixture of such salts, which is water-soluble at a pH within the range of 5.0 to 8.5 and which has an acid moiety whose zinc salt is water-soluble at a pH within the range of 5.0 to 8.5. A wide variety of neutralized salts having such properties are well known and readily available and include, for example, the water-soluble alkali metal, alkaline earth metal, alkanolamine, amine and quaternary ammonium salts of chloride, iodide, bromide, acetate, lactate, benzoate, citrate, butyrate, glycerophosphate, nitrate, salicylate, tartrate, valerate, propionate, phenolsulfonate, toluenesulfonate, formaldehydesulfoxate, ethylenediaminetetraacetate, sulfate, bisulfate, chlorate, perchlorate, hypophosphate, glycholate, and the like. Typical water-soluble alkali and alkaline earth metal salts are formed with sodium, potassium, lithium, strontium, calcium, magnesium, etc., and typical water-soluble alkanolamine salts would be formed with monoethanolamine, diethanolamine, triethanolamine, Tris, and the like. Soluble amine salts are typified by the use of ammonium, ethylamine, diethylamine, propamine, and other soluble primary, secondary, or tertiary amines. A typical water-soluble quaternary ammonium compound is cetylpyridinium chloride and other physiologically safe quaternary compounds are also acceptable. Specific examples of suitable neutralized salts which can be used in accordance with the present invention include sodium citrate, ammonium citrate, ammonium acetate, potassium benzoate, potassium phenolsulfonate, triethanolamine lactate, magnesium propionate, disodium ethylenediaminetetracetate, magnesium chloride and sodium phenolsulfonate. This list is not intended to be inclusive, but rather illustrative of neutralized salts that can be used in accordance with the present invention. Partially neutralized salts may also be used providing the pH of their solutions is in the approximate physiological range.

To achieve the desired insolubilization-inhibiting effect, the neutralized salts can be added to the aqueous solution, alone or in combination, in amounts such that the weight ratio of the total sum of the neutralized salts to the water-soluble zinc salt is generally within the range of from about 0.1 to about 40, and preferably within the range of from about 1 to about 10. The specific quantity of neutralized salt to be used in each situation will depend upon the solubility and specific insolubilization-inhibiting activity of the particular neutralized salt. The quantity needed will also depend on the type of insolubilization-inhibiting effect that is required. For instance, neutralized salts with lower insolubilization-inhibiting activity or a reduced quantity of a neutralized salt can be used when the insolubilization-inhibiting effect need last only a short period of time as in the case of extemporaneously prepared solutions, as compared to those solutions which will be stored and need to remain clear for long periods of time.

In accordance with another aspect of the present invention, it has been found that the above-described neutralized salts can be used in conjunction with various chelating agents for zinc, such as ethylenediaminetetracetic acid (EDTA), to reduce to a physiologically acceptable level the amount of chelating agent otherwise required to inhibit the insolubilization of zinc in the presence of other physiologically active ingredients normally tending to insolubilize the zinc. For instance, at a pH of 6.0 and above, and in the presence of 0.05 molar or more of phosphate ion, an EDTA to zinc ratio of greater than 8 to 1 is usually required to inhibit the insolubilization of zinc under these conditions. Such large amount of EDTA is generally undesirable for certain physiological applications, such as the rectal adminstration of the solution for cathartic and deodorant action since it presents too great a risk of mineral chelation within the body. It has been found, however, that the ratio of EDTA to zinc necessary to inhibit the insolubilization of the zinc can be reduced to 6 to 1 or less without the need to reduce the pH of the solution if a neutralized salt as described above is used in conjunction with the EDTA. Moreover, it has been found that in this type of application, the neutralized salt effectively prevents the zinc from tying up with bile salts, protein or fecal matter in the intestines so that the zinc will be available for contact with the odoriferous sulfide gases and hence exhibit its deodorizing effect.

The neutralized salts may similarly be used in accordance with the present invention with other well known chelating agents for zinc, in addition to EDTA, such as, for example, malic acid, citric acid, fumaric acid, hydroxyacetic acid, tartaric acid, lactic acid, gluconic acid, racemic acid, maleic acid, succinic acid, oxalic acid, malonic acid, glutaric acid, and adipic acid.

The following examples will illustrate the effectiveness of the present invention.

EXAMPLE 1

When 0.20% zinc chloride, equivalent to 0.094% zinc, was added to a clear aqueous solution of 1.0 molar sodium phosphate at a pH of 6.5, precipitation of insoluble zinc occurred. A minimum of 0.8% EDTA (EDTA to zinc ratio of 8.5 to 1) was required to solubilize the zinc. With lesser amounts of EDTA, the zinc could also be solubilized by reducing the pH of the solution to about 4.0 with any suitable acid. However, when the resulting solution at pH 4.0 was rectally administered as an enema, immediate burning ensued.

When 0.20% of sodium citrate was added to the original zinc chloride-sodium phosphate solution described above, only 0.55% of EDTA (EDTA to zinc ratio of 6 to 1) was required to solubilize the zinc. When the concentration of sodium citrate was increased to 1.0%, then only 0.40% EDTA (EDTA to zinc ratio of 4 to 1) was required to solubilize the zinc. Furthermore, the pH of the sodium citrate-EDTA solubilized zinc solutions remained at pH 6.5 and were not irritating and were very acceptable upon rectal administration. The reduced EDTA level is also more compatable with rectal use. These solutions remained clear after extended storage at 25°C.

EXAMPLE 2

When the sodium citrate of Example 1 was replaced by 1.0% of potassium phenolsulfonate, the EDTA required to solubilize the zinc was reduced to 0.4% with the pH at 6.3. This solution also remained clear after extended storage at 25°C.

EXAMPLE 3

When 0.45% of zinc nitrate hexahydrate, equivalent to 0.10% of zinc, was added to a clear aqueous solution of 1.50 molar sodium phosphate at a pH of 6.5, the solution became turbid as the zinc nitrate was added, then briefly turned clear, followed shortly by precipitation of the zinc phosphate, zinc hydroxide and similar insoluble species.

When 0.30% of magnesium propionate (0.67 parts per part of zinc nitrate hexahydrate) was added, the precipitation was retarded for up to 24 hours, while 1.35% of magnesium propionate (3 parts per part of zinc nitrate hexahydrate) retarded precipitate formation for at least 48 hours and significantly reduced the magnitude of the precipitate. In both cases, the addition of magnesium propionate allowed the extemporaneous preparation of clear solutions at pH 6.6 to 6.8 which were stable over the course of several days, and which could be used as enemas or as skin dressings.

EXAMPLE 4

In the case illustrated in Example 3, above, when 1.35% of sodium phenosulfonate was added in combination with 1.35% of magnesium propionate, the solution was still clear after one month at 25°C.

EXAMPLE 5

When 0.05% of zinc chloride was added to a 3% aqueous castile soap solution, which is high in sodium oleate and sodium palmitate, an immediate, dense precipitate of zinc occurred. This precipitate prevents the use of zinc for its deodorant and astringent effect in soap enemas or in topical cleansers. However, when 1.0% of ammonium citrate was added to the solution, precipitation was retarded for at least 30 minutes, thereby enabling satisfactory use of the solution as an enema or topical cleanser.

What is claimed is:

1. A composition for use in physiological administration comprising an aqueous solution having a pH within the range of from 5.0 to 8.5 of a water-soluble zinc salt in a proportion sufficient to provide a physiologically active zinc ion concentration, at least one other physiologically active ingredient selected from the group consisting of water-soluble phosphates, soaps, fatty acids, proteins and protein hydrolysates in a proportion normally tending to insolubilize said zinc ions, and a neutralized salt which is water-soluble at a pH within the range of from 5.0 to 8.5 selected from the group consisting of water-soluble alkali metal, alkaline earth metal, alkanolamine, amine, and quaternary ammonium salts of an acid whose zinc salt is water-soluble at a pH within the range of from 5.0 to 8.5, the weight ratio of said neutralized salt to said zinc salt being within the range of from about 0.1 to about 40, whereby the insolubilization of said zinc ions by said other physiologically active ingredient is inhibited by said neutralized salt.

2. The composition of claim 1 wherein the weight ratio of said neutralized salt to said zinc salt is within the range of from about 1 to about 10.

3. The composition of claim 1 wherein the pH of said aqueous solution is within the range of from 6.0 to 7.5.

4. The composition of claim 1 wherein said water-soluble zinc salt is present in a proportion sufficient to provide an active zinc ion concentration on the order of about 0.1%.

5. The composition of claim 1 wherein said water-soluble zinc salt is selected from the group consisting of zinc chloride, zinc nitrate, zinc sulfate and zinc acetate.

6. The composition of claim 1 wherein the acid moiety of said neutralized salt is selected from the group consisting of chloride, iodide, bromide, acetate, lactate, benzoate, citrate, butyrate, glycerophosphate, nitrate, salicylate, tartrate, valerate, propionate, phenolsulfonate, toluenesulfonate, formaldehydesulfoxalate, ethylenediaminetetraacetate, sulfate, bisulfate, chlorate, perchlorate, hypophosphate and glycholate.

7. The composition of claim 1 additionally containing ethylenediaminetetracetic acid in a weight ratio to zinc of no greater than about 6 to 1.

8. In a method for the physiological administration of an aqueous solution containing a water-soluble zinc salt in a proportion sufficient to provide a physiologically active zinc ion concentration and at least one other physiologically active ingredient in a proportion normally tending to insolubilize said zinc ions, the improvement comprising inhibiting the insolubilization of said zinc ions in said solution by incorporating in said solution a neutralized salt which is water-soluble at a pH within the range of from 5.0 to 8.5 selected from the group consisting of water-soluble alkaline earth metal, alkali metal, alkanolamine, amine, and quaternary ammonium salts of an acid whose zinc salt is water-soluble at a pH within the range of from 5.0 to 8.5, the weight ratio of said neutralized salt to said zinc salt being within the range of from about 0.1 to about 40.

9. The method of claim 8 wherein the weight ratio of said neutralized salt to said zinc salt is within the range of from about 1 to about 10.

10. The method of claim 8 wherein the acid moiety of said neutralized salt is selected from the group consisting of chloride, iodide, bromide, acetate, lactate, benzoate, citrate, butyrate, glycerophosphate, nitrate, salicylate, tartrate, valerate, propionate, phenolsulfonate, toluenesulfonate, formaldehydesulfoxalate, ethylenediaminetetraacetate, sulfate, bisulfate, chlorate, perchlorate, hypophosphate and glycholate.

11. The method of claim 8 wherein ethylenediaminetetracetic acid is additionally incorporated in said solution in a weight ratio to zinc of no greater than about 6 to 1.

* * * * *